May 28, 1929.   H. BEHNER   1,714,586
WIPER MECHANISM
Filed Dec. 1, 1924   4 Sheets-Sheet 2
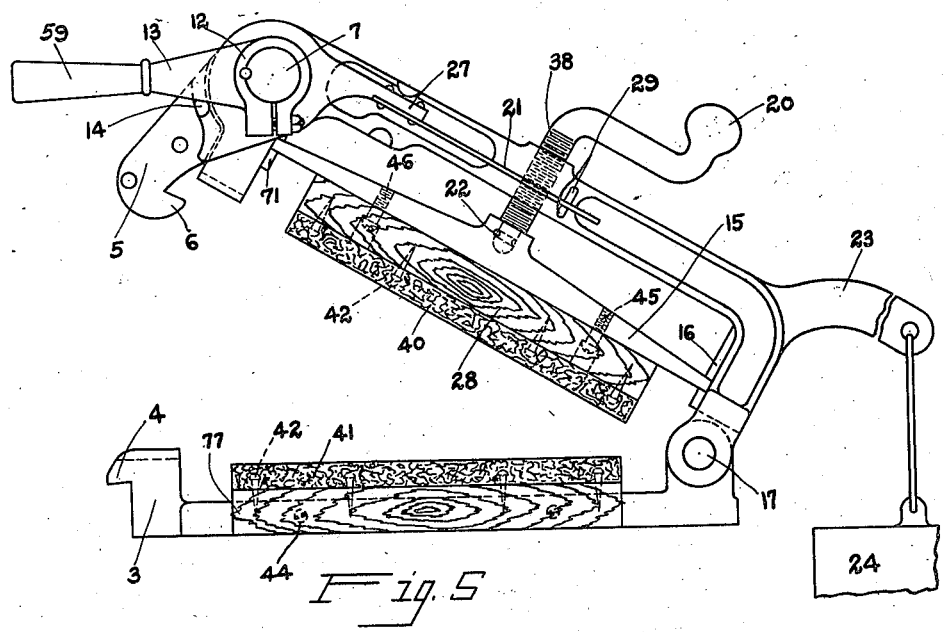
Fig. 5
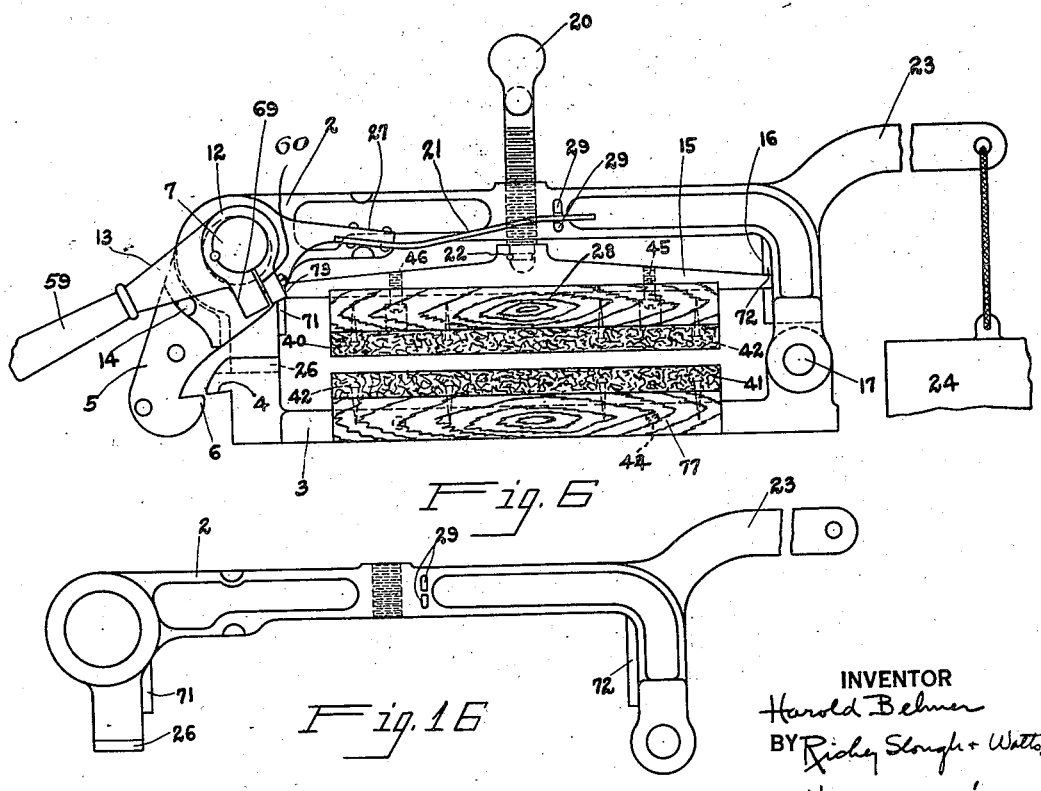
Fig. 6
Fig. 16
INVENTOR
Harold Behner
BY Richey Slough + Watts
His ATTORNEYS.

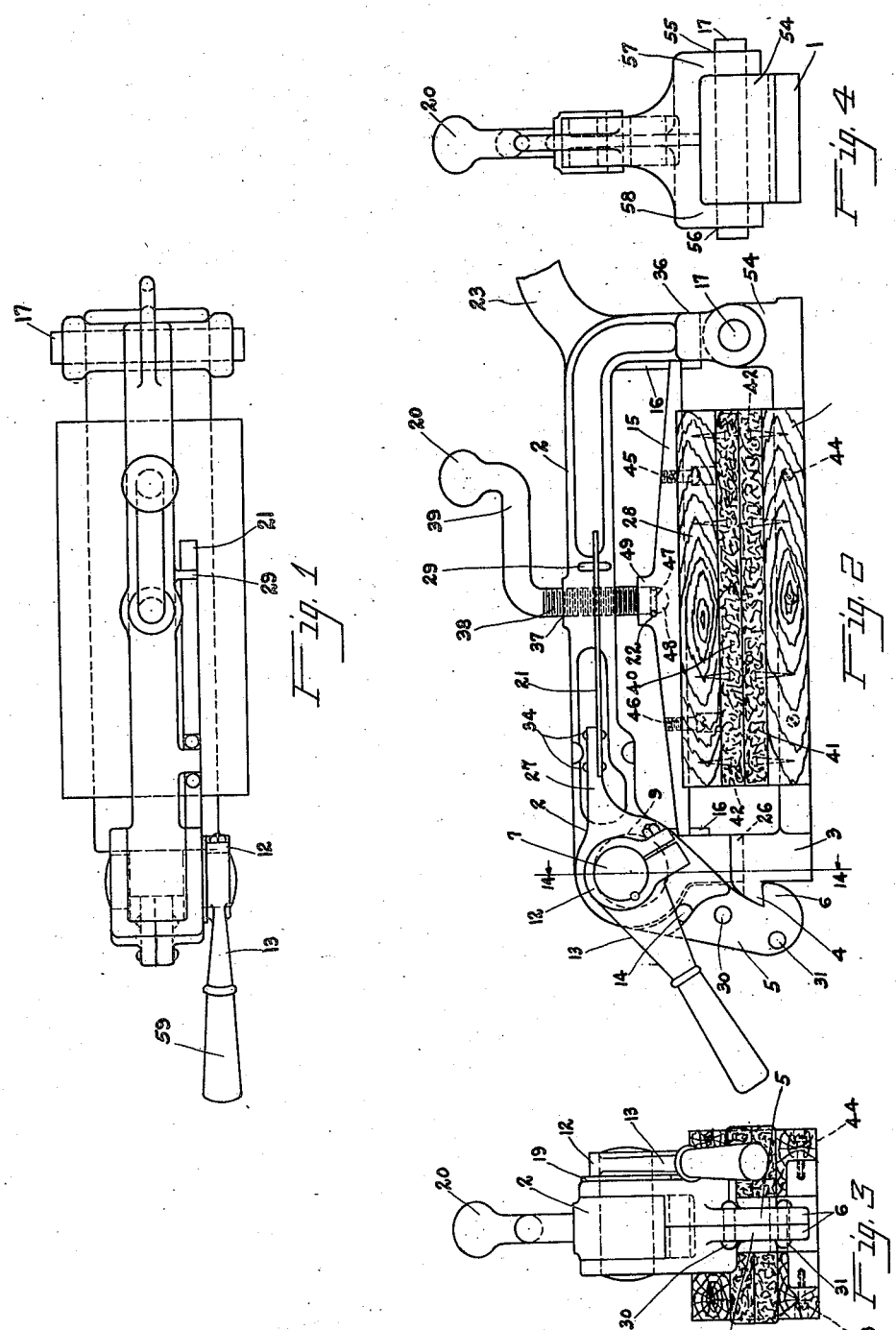

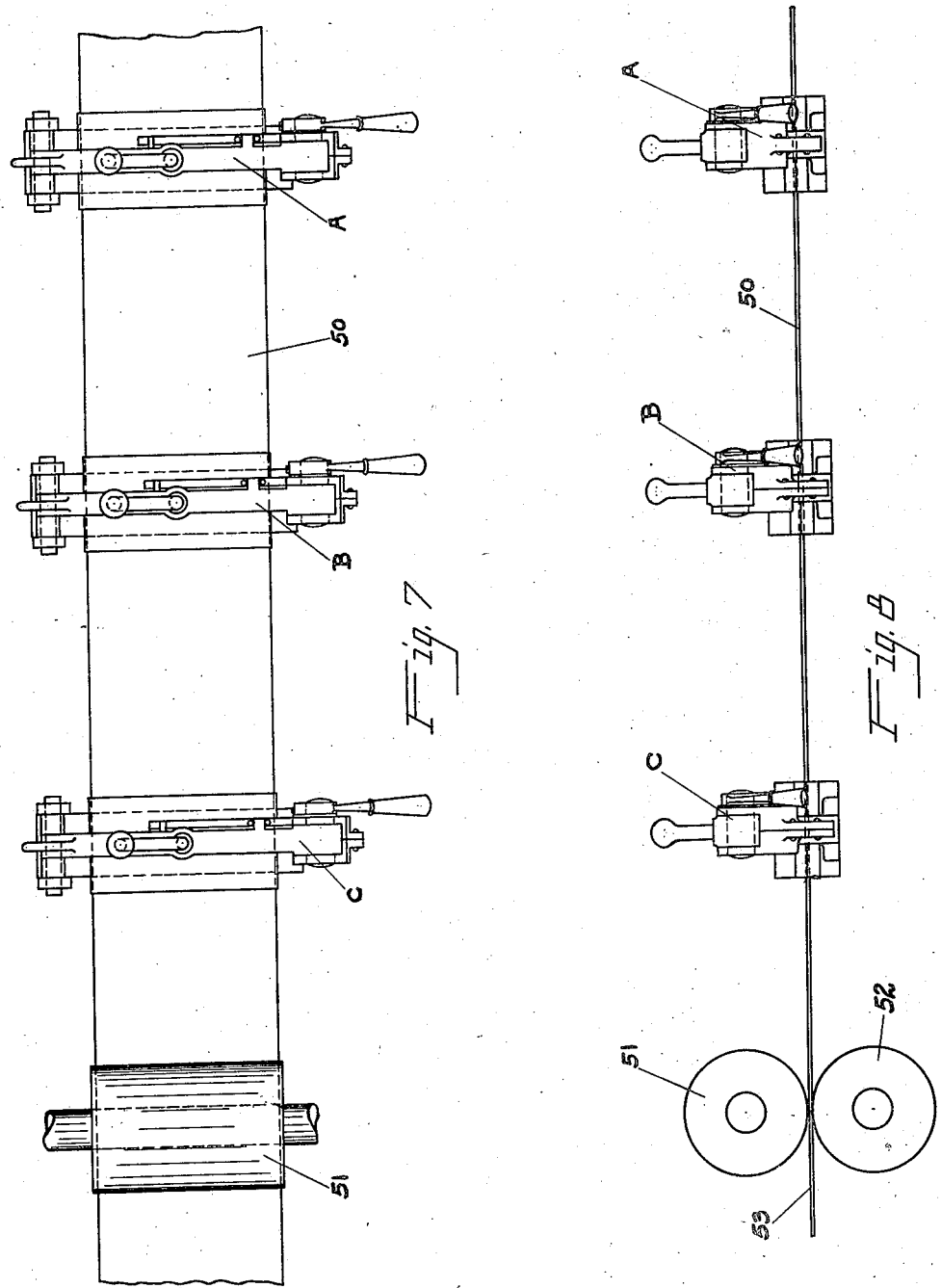

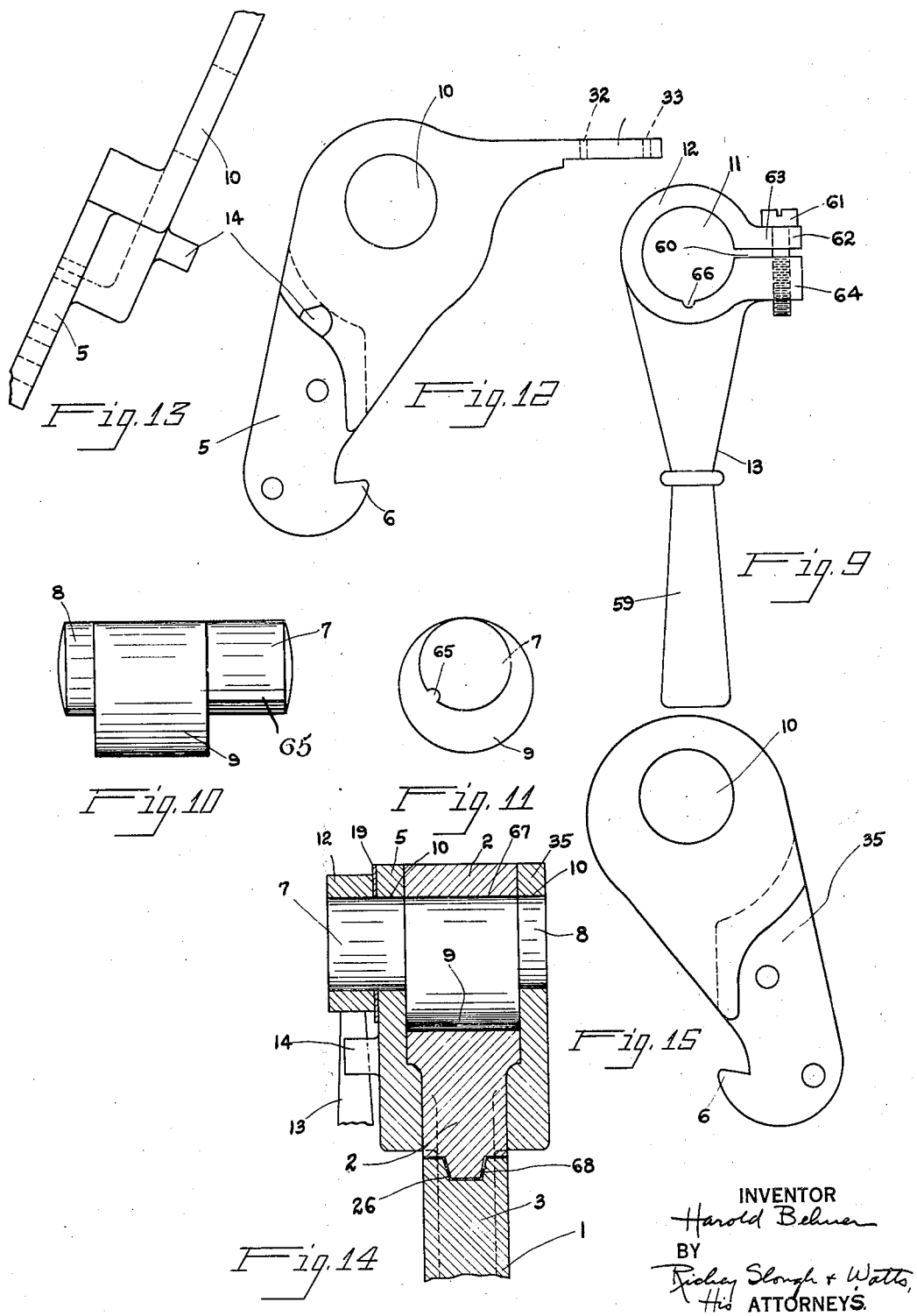

Patented May 28, 1929.

1,714,586

UNITED STATES PATENT OFFICE.

HAROLD BEHNER, OF LAGRANGE, OHIO, ASSIGNOR, BY MESNE ASSIGNMENTS, TO STEEL AND TUBE, INC., OF CLEVELAND, OHIO, A CORPORATION OF OHIO.

WIPER MECHANISM.

Application filed December 1, 1924. Serial No. 753,224.

My invention relates to wiper mechanisms for metal sheets, and relates particularly to wiper mechanisms employed for the purpose of cleaning sheet metal such as sheet steel by frictional contact of wiper surfaces of the mechanism with the sheet metal as it is passed between such wiper surfaces.

Although not limited to such a use, the wiper mechanisms of my invention are very advantageously employed for cleaning the surfaces of sheet steel in a rolling mill prior to the admission of the sheet steel material to the rolls adapted to compress the sheet steel to bring it down to a given thickness. The sheet steel supplied in reels ready for the rolling process ordinarily is very dirty, containing on its surfaces gritty substances as well as rust and which would prevent the rolled product from exhibiting a smooth rolled exterior surface. Unless some kind of wiper mechanism is applied to the sheet steel before the same is introduced to the rolls, these gritty and other foreign substances will be rolled into the material of the metal, causing it to exhibit a rough and undesirable surface.

It has, therefore, been the practice to first pass the strip sheet metal through wiping surfaces of wipers, so-called, a series of which being usually provided prior to the passing of the strip material into the rolls, and it has been the practice also in some cases to provide some kind of pressure creating mechanism which will increase the pressure exerted by the wiper surfaces against the sheet material passing through the wiper. However, such devices have been unsatisfactory for several reasons, one being that the machines must be adjusted for wiper pressure every time a new sheet of material is to be passed through the wipers, this involving quite a little time and involving inaccuracies in the pressure creating adjustment, there being no provision made in such prior mechanisms, so far as I am aware, to always insure that the pressure creating adjustment is the same in all cases; second, there has always been difficulty in opening up the opposing wiping portions so as to permit the insertion of a new strip of sheet metal to the space between the wipers; third, after the wiping members have been opened up and a new strip of material introduced, the provision for again applying pressure to the wiper surfaces has been very crude and unsatisfactory.

It is an object of my present invention, therefore, to provide a wiper mechanism in which the above defects are corrected and which may be adjusted to give a predetermined pressure adjustment to the wipers of the mechanism so that they will always exert the same predetermined pressure on the sheet metal material operated upon.

Another object of my invention is to provide a structure wherein the space between the wiper surfaces may be opened up to admit a new strip of material between such surfaces and to readily and quickly permit the application again of the wiping pressure, the adjustment for which being not disturbed in the meantime.

It is an object also of my present invention to provide such a novel and improved latching and unlatching mechanism for a pressure applying mechanism of this type that the two opposing pressure surfaces may be opened up by a single operative manual effort on the part of the operator and be closed again to the same pressure adjustment in a single manual effort.

Another object of my invention is to provide a wiper comprising two frame members, the wiping surfaces of which may be moved to a very wide open position wherein the frame members will be disposed at such an angle that an opening will be left to permit the lateral removal or insertion of the sheet material to the position between the wipers wherein such material may be operated upon.

Other objects of my invention and the invention itself will become apparent as the description of a specific embodiment thereof illustrated in the accompanying drawings progresses and in which description reference will be had to said drawings.

Referring now to the drawings—

Fig. 1 shows a top plan view of a wiper mechanism embodying my invention;

Fig. 2 is a side elevational view of the embodiment illustrated in Fig. 1;

Fig. 3 is a front end elevational view of the embodiment of Fig. 1;

Fig. 4 is a rear end elevational view thereof;

Fig. 5 shows the embodiment of Fig. 1 in side elevational view, but with the mechanism in partly open position to admit sheet steel between the wiping surfaces or to permit the removal thereof therefrom;

Fig. 6 shows the same mechanism as in Fig.

5 in similar view except that Fig. 6 shows the mechanism in nearly closed position;

Fig. 7 shows a top plan view of a series of the mechanisms arranged one after the other in line with a pair of rolls and a portion of a sheet of sheet material such as sheet steel passing between the wiping surfaces of the three wipers illustrated and thence between the rolls;

Fig. 8 is a view taken of the apparatus of Fig. 7 in front end elevation;

Fig. 9 shows an elevational view of the hand lever employed to operate the wiper mechanism of the foregoing figures;

Fig. 10 is an elevational view of an eccentric shaft adapted to be rotated by the lever of Fig. 9;

Fig. 11 is an end plan view of the eccentric cam shaft of Fig. 10;

Fig. 12 is an elevational view of a hook member operable by the lever and cam of Figs. 9 to 11 inclusive, there being two complementary hook members of this kind secured rigidly together to operate as a single member;

Fig. 13 is an end elevational view of the hook member of Fig. 12;

Fig. 14 shows a transverse sectional view taken on the line 14—14 of Fig. 2 showing the relation of the eccentric cam shaft when the said apparatus is in closed or "wiping position";

Fig. 15 shows a side elevation of a hook member which is complementary to that of Figs. 12 and 13, and adapted to be rigidly secured to the same so that the two hook members act as a single hook element.

Fig. 16 shows a side elevation of the upper frame member.

Referring now to the different figures of drawing and in which figures like parts are designated by like reference characters, at 1 I show a base which is hinged by a pin 17 to an upper frame member 2. The base member 1 has a forwardly extending flange 3 in its mid-portion, said flange carrying a hook end 4, the said flange with its hook end and the base 1 being preferably cast in one integral piece. At 5 and 35 I show a pair of complementary hook members riveted together as shown at 30 and 31, one of these being perhaps best illustrated in Figs. 12 and 13 which shows one of the hook members having openings for the rivets 30 and 31, and a hook end 5.

The hook members 5 and 35 have a circular opening 10 in their mid-portions, there being a rearwardly extending arm 27 of the hook members perforated at 32 and 33 to admit rivets 34 for the purpose of securing to the said rearwardly extending arm, a flat leaf spring member 21. The opening 10 is adapted to receive an end 7 of the eccentric shaft illustrated in Figs. 10 and 11 and shown in the other figures. The hook member 5 has a laterally extending boss 14 acting as a stop as will be later described. When two of the hook members 5 and 35 are riveted together as by rivets 30 and 31, after the opening 10 of each of the members are passed over the ends 7 and 8 of the eccentric shaft of Figs. 10 and 11, the hook portions 6 thereof are joined to make a single hook of double width.

In Fig. 15 I show the other complementary hook member which differs only from the hook member of Figs. 12 and 13 in that it does not have the rearwardly extending arm 27 nor the spring 21 supported thereon, being in nearly all other respects constructed like that of Figs. 12 and 13, but complementary thereto, having its portions extending laterally in opposite directions to that of Figs. 12 and 13. The hook member 35 shown in Fig. 15 however, does not have the laterally extending lug 14, this being unnecessary in the case of this hook member.

The top frame member 2 is formed of a single integral casting extending from the hinge portion 36 to the depending tongue 26, and comprises a threaded opening 37 in its midportion for the reception of a threaded rod 38 having a handle portion 20, and which carries at its other extremity the upper wiping supporting plate 15. The upper frame member 2 is also perforated in its forward portion to receive the cylindrical eccentric portion of the eccentric shaft shown in Figs. 10 and 11.

The wiper mechanism comprises a pair of wipers 40 and 41 which may be constructed of felt or like material secured by a plurality of nails or screws 42 to supporting boards 28 and 77 respectively, for the upper and lower wipers. The board 77 is secured by a plurality of machine screws as 43 and 44 to the base casting 1 or in any other suitable manner to such casting, and the supporting board 28 is secured to the wiper supporting plate 15 by a plurality of machine screws as 45 and 46. The plate 15 is carried on the end of the threaded rod 38. This rod contains near its end a peripheral groove 47. The wiper supporting plate 15 has in its central portion an upwardly projecting boss 49, the boss 49 containing a vertical recess 48 into which the grooved end of the threaded rod 38 is placed and the key pin 22 is passed through the walls of the boss and projecting partially within the groove 47 to maintain the end of the rod 38 rotatably secured within such recess so that the wiper plate 15 may be raised or lowered by the rotation of the rod 38 in the threaded opening 37 of the top plate 2.

The arrangement of apparatus as so far described permits the wiper surfaces 40 and 41 to be brought closely together so as to exert pressure on a strip of sheet metal such as sheet steel placed between the wiper surfaces.

Referring particularly to Figs. 7 and 8 such a strip of sheet steel is indicated at 50, and is placed between the wiper surfaces of a plurality of wiper mechanisms of my present invention shown in Figs. 7 and 8 at A, B and C, the sheet steel 50 passing from a reel not shown to the right of the apparatus illustrated and through the wipers A, B and C to be compressed between hardened steel rolls 51 and 52 emerging therefrom at 53.

It will be understood that although I have shown in Figs. 2, 3, 5 and 6 the wiping material as being felt or like fibrous material, the same may comprise a surface to contact with the metal sheet of any desirable material. For instance, particularly for the first wiper of the series shown at A in Figs. 7 and 8, it is desirable in some cases to face the wiping surface with crocus-cloth or like abrasive material, and my invention comprehends wiping surfaces of any desired material to accomplish the cleaning or wiping function.

As has been said, the frame 1 and the upper frame member 2 are secured together by a hinge joint comprising a pin 17.

Referring particualrly to Figs. 1, 2 and 16 inclusive, the pin 17 is projected through a hinged opening extending through a transverse opening through the upwardly extending flange 54 of the base 1 and aligned openings 55 and 56 in the two forks 57 and 58 of the bifurcated end of the upper frame member 2. A rearwardly extending arm 23 is provided for supporting a weight 24 for counter-balancing to any suitable degree the weight of the forwardly extending portions of the upper frame member 2 and the parts carried thereby so as to enable the operator to lift the upper frame member rotating on the hinge pin 17 so as to permit the opening of the wiper with little or no manual effort. Obviously, when the upper frame member is raised to substantially vertical position, it will be so held by the weight and permit the operator to lay a strip of material upon the lower wiper pad without having to thread it between pads as has been done heretofore.

When the apparatus is to be closed so as to cause the wiping surfaces of the material 40 and 41 to press firmly against an intermediate strip of sheet metal such as the sheet metal steel strip 50, the handle 59 for the lever 13 is pressed by the operator and the top frame member 2 rotated on the hinge pin 17 from the position shown in Fig. 5 downwardly through the intermediate position shown in Fig. 6 and finally pressure being exerted downwardly on the handle 59, the catch 6 of the hook member 5 is projected forwardly under the latch 4 of the base plate forward portion 3 by the edge of the lever 13 engaging the laterally extending lug 14 carried on the hook member 5, the downward pressure on the handle 59 continuing and causing the catch 6 and latch 4 to become engaged and then a pressure is exerted to lift the hook member 5 relative to the catch member 4 so that the hook member 6 being restrained from lifting, the upper frame member 2 will be projected downwardly with considerable pressure. This is accomplished through the action of the rotatable eccentric shaft 7 comprising portions 7, 8 and 9 and such action being now specifically described in detail.

For the purpose of such description, reference will be had especially to Figs. 9 to 14 inclusive wherein there is shown an eccentric cam shaft comprising shaft portions 7, 8 and 9, each being preferably cylindrical, the intermediate portion 9 being of the greatest diameter, and being axially displaced from the carrying portions 7 and 8 producing an eccentric shaft, the portions 7 and 8 carrying the portion 9.

Secured to the end of the portion 7 is the lever 13, such lever having an opening 11 at one end and a handle 59 at the other end, the portion 12 containing the opening 11 being split at 60 and the size of the opening 11 being capable of being made smaller by a machine screw 61 loosely passing through an opening 62 in the portion 63 and being threaded into the portion 64 of the lever member, so that when the screw 61 is advanced through the opening, it will pull the portions 63 and 64 together to tightly grip the end 7 of the eccentric shaft. The end 7 also is notched at 65 and the lever portion 12 being notched at 66 a key pin insertable through aligned notches 66 and 65 will prevent the rotation of the lever member 13 on the shaft end 7. The portions 7 and 8 are journaled in opening 10 in the hook members 35 and 5 respectively. A washer 19 is preferably placed between the lever portion 12 and the hook portion 5. The frame member 2 being perforated at 67 receives the intermediate enlarged cylindrical portion 9 of the eccentric shaft, the arrangement being such that upon rotation of the shaft, the frame member 2 will be displayed vertically with reference to the hook members 5 and 35. The frame member 2 terminates in its extreme lower forward portion in a tongue 26 projecting in a notch 68 of the forward portion 3 of the lower frame or base member 1, so this provides correct alignment of the upper frame member 2 with the lower or base member 1, and predetermines the degree of downward movement of the upper frame member 2 to compress the wiper pads against the sheet metal material to be cleaned. However, the arrangement is such that upon a full downward movement of the handle 59 rotating about the eccentric shaft portion 7 and the hook catch 6 having its upper surface engaging with the lower surface 4 of the latch, these parts are prevented from moving, and therefore the upper frame member 2 will be projected downwardly until the projection 26 enters the notch 68 and the adjoining surfaces of the portions 26 and 3 are in engagement. The device is reopened by lifting the handle 59 whereupon the surface 69 of the lever member 13 will come into contact with the stud 14 of the hook member 5 and lift the hook members 5 and 35 from latching engagement with the latch 4 of the base member, and the handle 59 being lifted upwardly will cause the upper frame member and the upper wiper to attain an elevated position such as shown in Fig. 5.

It is to be noted that the spring 21 secured to the rearwardly extending arm 27 of the hook member 5 is passed between a pair of lugs 29 extending laterally from the frame member 2; this, while not essential is sometimes advantageous as the spring 21 gives the latching movement a kind of snap action.

The upper wiper supporting plate 15 is guided in its vertical movement by guides 16 and 17 which extend inwardly from the side arms of the upper frame member 2, these guides 16 and 17 being vertical and of substantially uniform width and equidistant in all portions from each other, and are embraced by the bifurcated ends 72 and 73 of the upper wiper supporting plate 15.

It will be understood that the rotation of the threaded rod 38 will elevate or lower the wiper 40 to determine the amount of pressure that will be exerted downwardly by the upper wiper when the latching mechanism is operated after the device is closed, and that when a proper adjustment of the upper plate 15 by rotating the handle 20 of the threaded rod 38 is secured, this adjustment need not be changed, it being only necessary to open and close the entire device by means of the handle 59 in the manner described and at each closure the upper wiper will exert a downward pressure equal to the pressure exerted by it on the previous closure, and the operator need not, as has been the custom in previous arrangements, rotate the pressure rod 38 out of its adjustment in order to permit the insertion of a new strip of sheet metal into the device.

Moreover, it will be observed by referring particularly to Fig. 5, that the sheet metal may be placed between the wiper surfaces by moving the strip of sheet metal laterally between the open jaws of the device and between the hook member 5 and the catch member 4 thereof. This facilitates the insertion of a new strip of material which may be advanced into a plurality of such wiper mechanisms at one time instead of patiently threading the strip through each wiper separately and adjusting the pressure rod such as 38 for each mechanism separately.

Having thus described my invention in a specific embodiment, I am aware that numerous and extensive departures may be made from the embodiment herein illustrated and described, but without departing from the spirit of my invention.

I claim:—

A cleaner for metal strips which comprises relatively movable frame members, opposed wiper pads carried thereby adapted to receive a metal strip therebetween, means for adjusting the space between the pads, means for clamping the frame members together, and means for moving the clamped frame members toward each other whereby the pads grip the strip under pressure.

In testimony whereof I hereunto affix my signature this 25th day of November, 1924.

HAROLD BEHNER.